March 3, 1953     C. F. KRUCKER     2,630,303
CHEESE STIRRER
Filed Dec. 5, 1949     2 SHEETS—SHEET 1
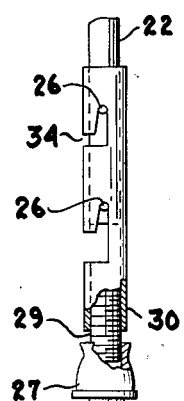
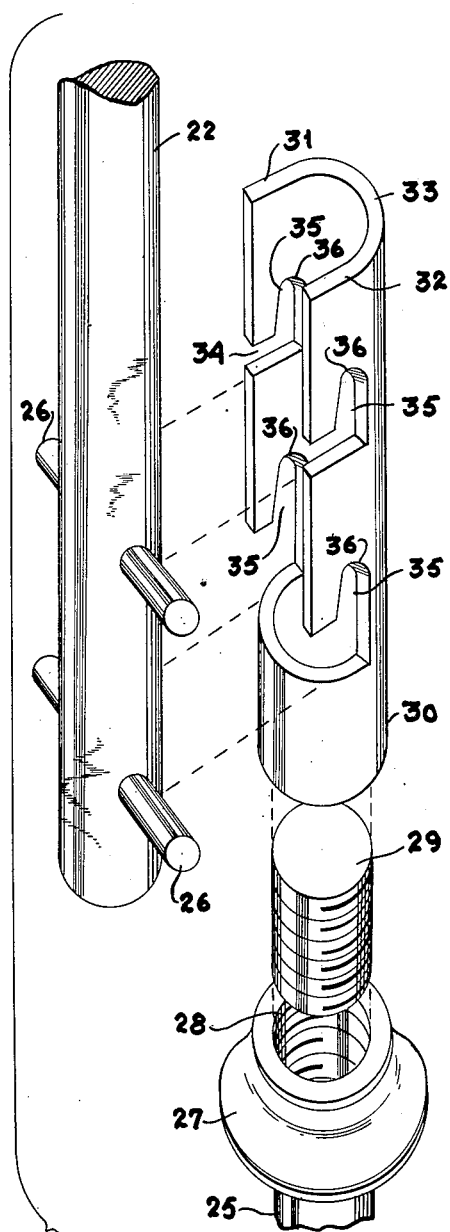
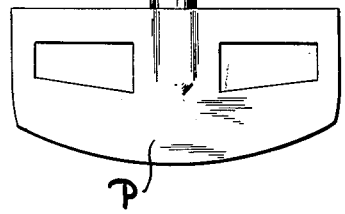
INVENTOR.
Charles F. Krucker
BY Joshua R. H. Potts
His Attorney March 3, 1953     C. F. KRUCKER     2,630,303
CHEESE STIRRER
Filed Dec. 5, 1949     2 SHEETS—SHEET 2
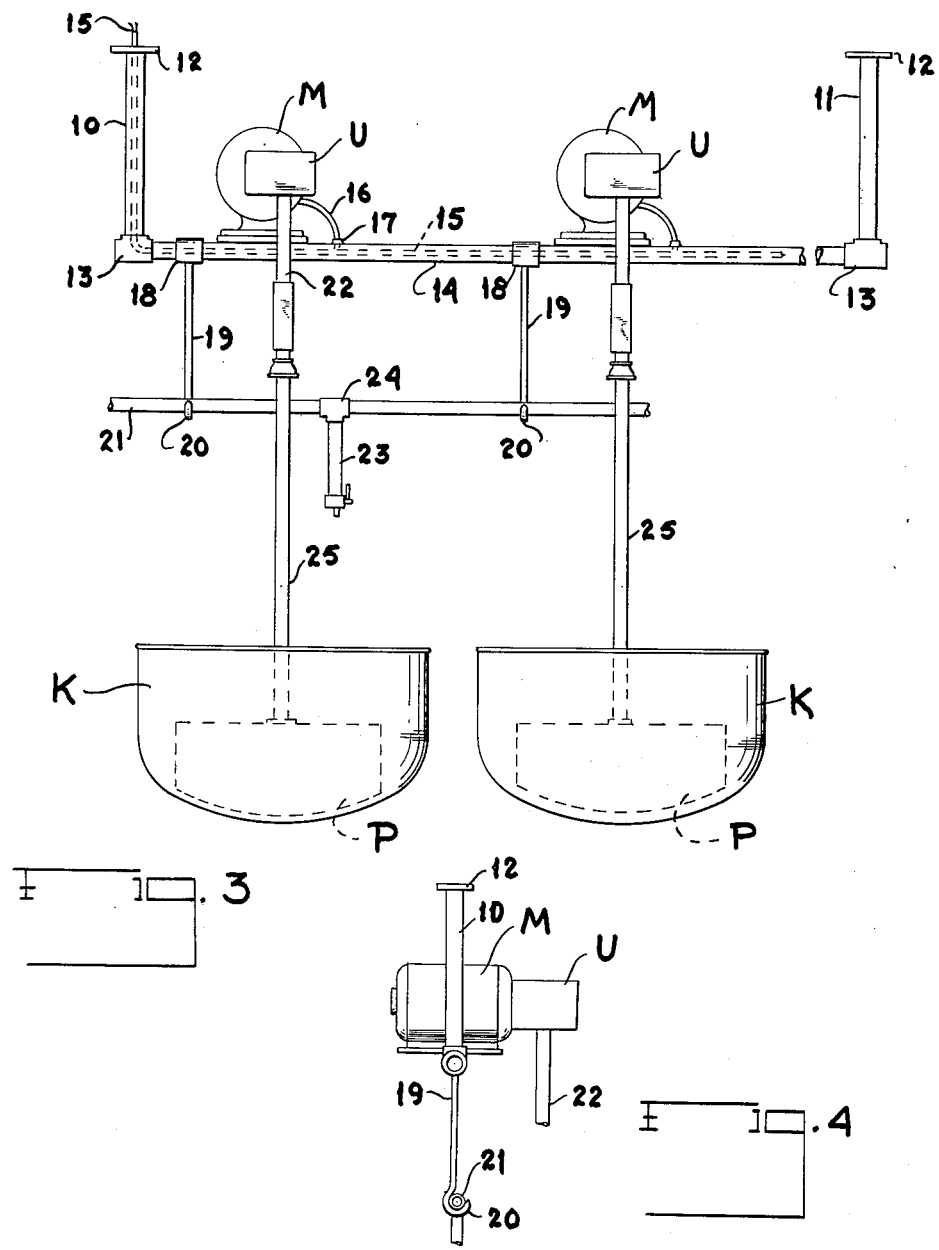
INVENTOR.
Charles F. Krucker
BY Joshua R. H. Potts
His Attorney Patented Mar. 3, 1953

2,630,303

UNITED STATES PATENT OFFICE 2,630,303

CHEESE STIRRER

Charles F. Krucker, Darlington, Wis.

Application December 5, 1949, Serial No. 131,145

3 Claims. (Cl. 259—108)

The present invention relates to apparatus for stirring cheese during the course of its production and is concerned primarily with a new type of installation which is now meeting with public acceptance.

During recent times there has come into use a type of apparatus for stirring cheese which consists essentially of an overhead structure that is supported from the ceiling of a room or building and which includes a plurality of electric motors. Positioned beneath these electric motors are a plurality of kettles which receive the material which ultimately is processed into the cheese. A paddle is associated with each kettle and this paddle is driven from an electric motor thereabove.

An important object of the present invention is to provide, in apparatus of the character described, a shaft which is driven from one of the electric motors together with a shaft that is permanently secured to one of the paddles and a quickly detachable driving connection between the two shafts.

More in detail, the invention has as an object the provision of an arrangement in which a vertical stub shaft is driven from one of the electric motors through appropriate reduction gearing. This stub shaft carries certain elements of a quickly detachable driving connection. Upstanding from one of the paddles is a shaft, the upper free end of which is provided with complemental elements of the detachable connection. Thus, the paddle may quickly be connected to the motor-driven shaft in driving relation with respect thereto or quickly detached therefrom.

Still another object of the invention is to provide, in apparatus of the character indicated, a detachable driving connection between a motor-driven shaft and a paddle shaft and which connection is of the bayonet joint type. Two pairs of pins are arranged in spaced relation on the motor-driven shaft. A sleeve that is open at one side is connected to the upper end of the paddle shaft and is formed with bayonet slots which are adapted to receive said pins to establish a quickly detachable driving connection between the motor-driven shaft and the paddle shaft.

Various other more detailed objects and advantages of the invention such as arise in connection with carrying out the above noted ideas in a practical embodiment will, in part, become apparent, and in part be hereinafter stated as the description of the invention proceeds.

The invention therefore comprises a cheese stirrer which consists essentially of an overhead structure including electric motors from each of which depends a motor-driven shaft. Beneath this overhead structure there is a plurality of kettles with each kettle having a paddle with a shaft upstanding therefrom. Each paddle shaft is connected to a motor-driven shaft by a quickly detachable connection of the bayonet joint type.

For a full and more complete understanding of the invention, reference may be had to the following description and accompanying drawings wherein:

Figure 1 is a detailed view mostly in elevation but with parts broken away and shown in section of one of the paddles, the shaft upstanding therefrom, and the elements of the quickly detachable connection between the shaft and the motor-driven shaft;

Figure 2 is a perspective developing the several elements of the detachable connection in exploded relation;

Figure 3 is an elevational view, somewhat diagrammatic, depicting the nature of the complete installation; and Figure 4 is a detailed view in elevation taken on a vertical plane normal to the showing of Figure 3.

Referring now to the drawings wherein like reference characters denote corresponding parts, and first more particularly to Figure 3, a cheese stirring apparatus of the type with which this invention is concerned is therein illustrated and comprising a pair of hangers 10 and 11, each of which carries at its upper end a flange 12 which is adapted to be secured to a ceiling of a room or structure in which the hangers are located. These hangers 10 and 11 are of a tubular construction.

At the lower end of each of the hangers 10 and 11 there is a fitting 13 and extending between the fitting 13 there is a horizontal tubular supporting member 14. Mounted along the support 14 at appropriate intervals are a plurality of electric motors, each of which is designated M. Associated with each motor M is a gear reduction unit U.

The motors M and the gear reduction units U are of a well known character and are available on the market as such. It is deemed unnecessary to here illustrate these parts other than by their diagrammatic representation. Extending through the tubular hangers 10 and 11 and the horizontal support 14 is the wiring for the motors M which is represented at 15. Each motor may include a connection shown at 16 that terminates in a plug 17 which may be employed to either plug the motor in to start its operation or be pulled out to discontinue its operation.

Carried by the support 14 at appropriate intervals are a plurality of fittings 18. Each of these fittings 18 carries the shank 19 of a hook 20. The hooks 20 support a pipe or conduit 21 through which milk or whey is adapted to be conducted to the kettles as will be later described.

Extending downwardly from each of the gear reduction units U in a vertical direction is a shaft 22 which is driven from the motor M through the gear reduction unit U and which is herein referred to as the motor-driven shaft.

Disposed beneath each of the motors M is a kettle K. These kettles will ordinarily rest on the floor of the room from the ceiling of which depends the overhead structure. Obviously, all kettles could be supported on tables or other appropriate supporting means. Each of the kettles K is adapted to receive a predetermined quantity of materials which are to be processed into cheese. The milk or whey may be conducted to each kettle K through the pipe 21 and the outlet 23 for each kettle K which is disposed thereabove and which is connected to the conduit 21 by the T-coupling shown at 24.

Received in each kettle K is a paddle P having a shape generally conforming to that of the kettle in which it is adapted to be rotated to cause the necessary agitation of the materials being processed. Upstanding from each paddle is a paddle shaft 25.

Referring now more particularly to Figures 1 and 2, each motor-driven shaft 22 is shown as carrying two pairs of pins 26 with the pins of each pair extending outwardly from the shaft 22 in diametrically opposite directions and with the two pairs spaced apart. Secured to the upper end of each paddle shaft 25 is a coupling member 27 that is interiorly threaded as indicated at 28. Screwed into the threaded bore 28 is a stub shaft 29 having a portion which projects above the coupling 27. A sleeve 30 has a lower end section which is interiorly threaded and screwed onto the projecting portion of the stub shaft 29. Above this lower end section the sleeve 30 is of a split or open U construction providing side walls 31 and 32 that are joined by a curve or bend 33. The side walls 31 and 32 are formed with two pairs of bayonet slots having a spacing corresponding to the spacing of the two pairs of pins 26 on the shaft 22.

Each of these bayonet slots includes a horizontal entrance leg 34 which communicates with a vertical leg 35. Each pin 26 is adapted to pass through the entrance leg 34 into the leg 35 and thence upwardly in the latter to become nested into the curved end thereof which is represented at 36.

During actual making and breaking of the connection it is the sleeve 30 which is moved rather than the shaft 22 and pins carried thereby, and the action of the pins above described is merely relative to the sleeve 30.

Under normal conditions, gravity action on the sleeve 30 will maintain the pins 26 seated in the curved upper ends 36 of the vertical legs 35 of the bayonet slots. When occasion arises that it becomes necessary to break this driving connection all that is required is to raise the sleeve 30 upwardly until the pins 26 align with the horizontal legs 34. This sleeve may then be withdrawn from the motor-driven shaft 22.

Conversely when the connection is to be established this sleeve is applied by moving the horizontal entrance legs 34 over the pins 26 until the latter align with the vertical legs 35. The sleeve is then permitted to fall downwardly under gravity action to complete the driving connection.

While a preferred specific embodiment of the invention is hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. Cheese making apparatus comprising, in combination, a floor-supported kettle having a capacity to receive the predetermined quantity of the materials required to produce a wheel of cheese, a rotatable stirring implement comprising a stirring head adapted to be inserted into the kettle and an elongated shaft extending upwardly therefrom on the axis of the kettle, the lower edge of the stirring head being formed to the contour of the kettle bottom, ceiling-supported driving means for said implement comprising a horizontal supporting member suspended from and disposed adjacent the ceiling, and a combined electric motor, enclosed reduction gear means and an axially fixed vertical stub-shaft unit supported on said horizontal member, said driving shaft being disposed on the axis of the kettle and terminating at its lower end a short distance below the bottom line of the motor, whereby to provide vertical clearance space above the upper line of the kettle for the implement head during its insertion into and removal from the kettle, and complemental quick-detachable coupling means on the lower end of the driving shaft and on the upper end of the implement shaft for coupling said shafts together, said coupling means being engageable and disengageable by lowering and lifting movement, respectively, of the stirring implement with respect to the stub shaft and being further operative when engaged to transmit the weight of the implement to said unit and hence to said supporting member and to position the implement vertically so that its lower edge is in close proximity to the bottom of the kettle.

2. Cheese making apparatus as set forth in claim 1, wherein a milk supply pipe extends horizontally over the kettle and is detachably connected to the horizontal member and in close proximity thereto.

3. Cheese making apparatus as set forth in claim 1, wherein the supporting member is tubular and the electrical supply conductors for the motor are carried by and completely enclosed within said tubular supporting member.

CHARLES F. KRUCKER.

REFERENCES CITED

The following references are of record in the file of this patent:

UNITED STATES PATENTS

| Number | Name | Date |
| --- | --- | --- |
| 671,081 | Green | Apr. 2, 1901 |
| 1,171,380 | Arthur | Feb. 8, 1916 |
| 1,290,980 | Hackstedde | Jan. 14, 1919 |
| 1,376,593 | Tuttle | May 3, 1921 |
| 1,490,550 | Aeschbach | Apr. 15, 1924 |
| 1,598,400 | Simmonds | Aug. 31, 1926 |
| 1,608,712 | Anderson | Nov. 30, 1926 |
| 1,900,258 | Schiff | Mar. 7, 1933 |
| 1,967,891 | Lamoreaux | July 24, 1934 |
| 2,060,523 | Packer | Nov. 10, 1936 |
| 2,107,416 | Huth | Feb. 8, 1938 |